April 17, 1962 J. CLIFFORD 3,029,671
METHOD AND APPARATUS FOR THE REPAIR OF TUBELESS TIRES
Filed Dec. 7, 1959 2 Sheets-Sheet 1

INVENTOR.
Jack Clifford.
BY
Fishburn and Gold
ATTORNEYS.

April 17, 1962   J. CLIFFORD   3,029,671
METHOD AND APPARATUS FOR THE REPAIR OF TUBELESS TIRES
Filed Dec. 7, 1959   2 Sheets-Sheet 2
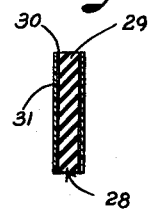
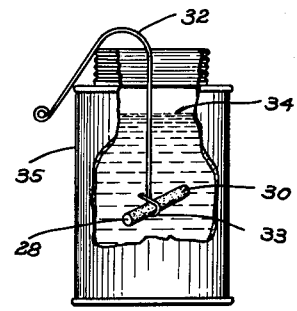
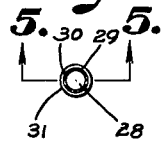
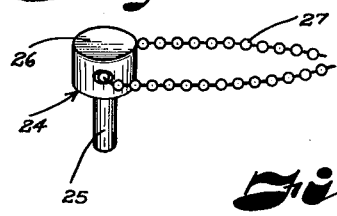
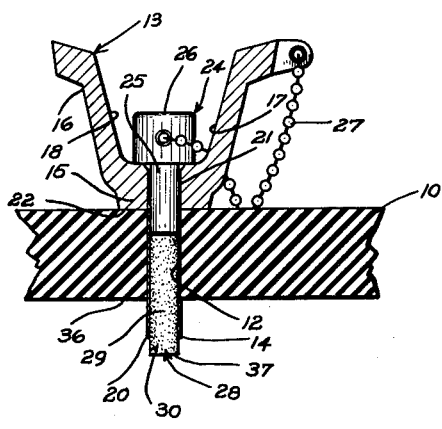
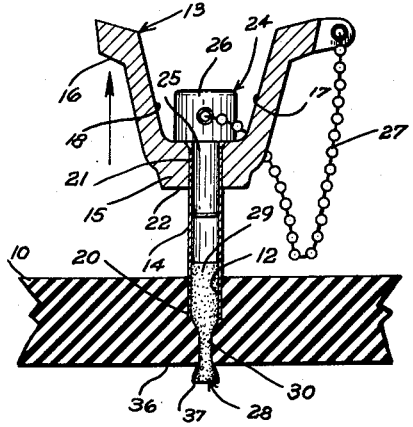
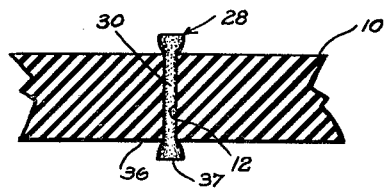
INVENTOR.
Jack Clifford.
BY
Fishburn and Gold
ATTORNEYS.

United States Patent Office 3,029,671
Patented Apr. 17, 1962

3,029,671
METHOD AND APPARATUS FOR THE REPAIR OF TUBELESS TIRES
Jack Clifford, 5617 Aberdeen Road, Kansas City, Kans.
Filed Dec. 7, 1959, Ser. No. 857,745
4 Claims. (Cl. 81—15.7)

This invention relates to a method and apparatus for the repair of tubeless tires, and provides a tool and procedure by which a tubeless tire may be repaired with simplicity, economy and reliability while mounted on the rim.

Heretofore, when it became necessary to repair a puncture in a tubeless tire, one of three methods were generally used. (1) The tire was dismounted from the rim and a flat patch was placed over the puncture hole on the inside surface of the tire. (2) A mushroom-shaped rubber plug was compressed into cylindrical form and inserted in a tube which had been forced through an enlarged hole formed at the puncture. When the mushroom section of the plug was pushed through the tube into the inside of the tire, it flared out very much like an umbrella and was then pulled back against the end of the tube with the stem portion which had remained extending out the other end. An attempt was then made to withdraw the tube from the tire, leaving the mushroom section at rest against the inside surface of the tire and thereby providing sealing means. The stem of the mushroom-shaped plug was generally hollow in order that an insertion tool could be used near the mushroom section to aid in forcing it through the tube. (3) A cylindrical plug was inserted in an enlarged hole formed at the puncture hole. A button hook type of device was used to force the plug into the hole which necessitated doubling the plug in order to hold it during insertion.

Serious problems accompanied each of the above methods. If the tire had to be dismounted, labor costs were high, and the procedure was excessively time-consuming, as well as incurring the risk that the bead of the tire would be damaged. The mushroom-shaped plug necessitated excess stretching, tearing or cutting of the hole, which weakened the tire, and, in addition, was unsatisfactory because the mushroom section could not bond to the inside surface of the tire, since such surface has deposited thereon a silicone coating which is an excellent bonding preventative. The mushroom section was thus often loosely held within the tire, and after heavy service, flexing of the plug adjacent the head resulted in its breaking off near the junction with the stem and air would leak through the hollow interior of the stem to the outside. Pulling on the stem also reduced its diameter, causing a looser fit in the hole. If repair was made with the button hook method, it was necessary to use a plug of excessive length to allow for doubling and, as with the mushroom plug method, the puncture hole had to be substantially enlarged by excess stretching, cutting or tearing, weakening the tire and also reducing the reliability of the seal, since the holding power of the tire on the plug was thereby greatly attenuated.

Applicant has overcome all of the aforementioned disadvantages by providing a method and apparatus for the repair of tubeless tires while mounted on the rim, which requires a substantially smaller plug opening than heretofore, uses a simple cylindrical plug of substantially shorter length than heretofore, and is highly economical and reliable.

An object of the present invention is to seal a puncture hole in a tubeless tire with a cylindrical plug without appreciably stretching or tearing the walls of the hole from their original size as formed by the puncturing object.

A further object of the present invention is to provide a tool means by which a sealing plug may be permanently implanted in a puncture hole with greater ease than heretofore due to the use of a thin walled hollow tube of substantially smaller diameter than known insertion tools.

A further object of this invention is to seal a tubeless tire puncture while the tire is mounted on the rim without using mushroom-shaped plugs or means which depend upon a seal with the inner surface of the tire.

Further objects of the present invention are to provide a method and apparatus for sealing punctures in tubeless tires wherein the puncture hole is expanded and a cylindrical rubber plug is inserted therein until the inner end of said plug extends a predetermined distance beyond the inner surface of the tire wall and the tire wall is released to contract about said plug to compress and engulf the portion thereof in the tire wall; and to provide such a method and apparatus wherein the plug is of rubber with a coating of gum or uncured rubber, and rubber solvent cement is used to aid in effecting a permanent vulcanized bond between the plug and tire.

Other objects and advantages of this invention will become apparent from the following description taken in connection with the accompanying drawings wherein are set forth by way of illustration and example certain embodiments of this invention.

FIG. 5 is a longitudinal sectional view of one preferred type of rubber plug for use with this invention, taken on a line 5—5, FIG. 6.

FIG. 6 is an end view of the plug shown in FIG. 5.

FIG. 7 is a side elevation, partly in section, of a container of rubber cement with a retainer holding the plug while it is being soaked in rubber cement to prepare it for insertion in the tire.

FIG. 8 is a perspective view of a gauge used for adjusting the position of the plug with respect to the inserted end of the tube tool.

FIG. 9 is a longitudinal sectional view of the tube tool retaining the plug which has been adjusted to its proper relation with respect to the inserted end of the tube with the gauge of FIG. 8.

FIG. 10 is a longitudinal sectional view of the tube tool being withdrawn from the tire tread with the plug head trapped in the contracting puncture hole.

FIG. 11 is a longitudinal sectional view through the tire tread showing the sealing plug retained in the contracted hole and ready for normal service.

Figure 1:
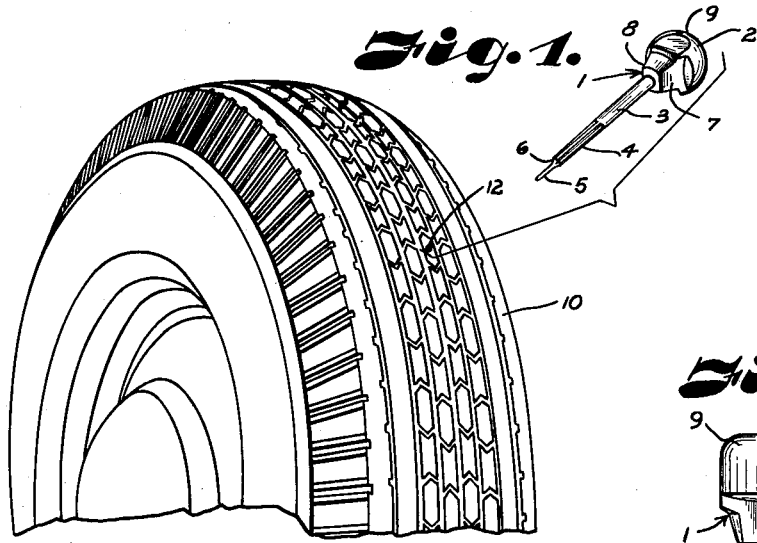
FIG. 1 is a perspective view showing a tire tread section with the buffer tool about to be inserted in a puncture hole.
Figure 2:
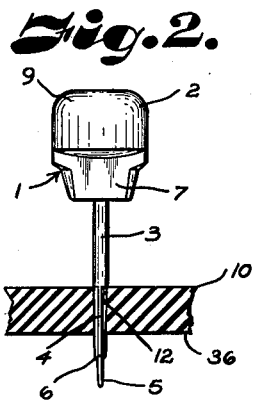
FIG. 2 is a side elevation of the buffer section of the tool inserted into the puncture hole of the tire tread, the tire tread being shown in section.

For the disclosure of one embodiment of the present invention, there is illustrated a buffer tool 1 (FIGS. 1 and 2) comprising a handle 2, shank 3, buffer section 4 which is composed of flutes cut in shank 3 which are defined by dull edges at the outer diameter of section 4, and guiding tip 5. The guiding tip 5 is of a diameter not larger than the root diameter of the flutes of section 4 and is useful as a probe and a guiding member in a manner which will be more fully described hereinafter. At the junction of tip 5 and buffer section 4, tapered edges 6 are formed which are sharp enough to produce only slight cutting. The buffer section 4 has a length greater than the thickness of the cross-section of the tread portion in a tubeless tire 10 so as to penetrate into the interior of the tire even if the puncture direction is not perpendicular to the tread face. Handle 2 has upwardly and outwardly extending sides 7 and 8 and a dome top 9 which is of a size and shape to conveniently fit in the palm of the hand. The buffer tool is shown in FIG. 1 positioned for insertion in puncture hole 12, which usually closes up so as to be almost invisible when the puncturing object is removed. FIG. 2 illustrates the buffer tool positioned for buffing the walls of puncture hole 12.

Figure 3:
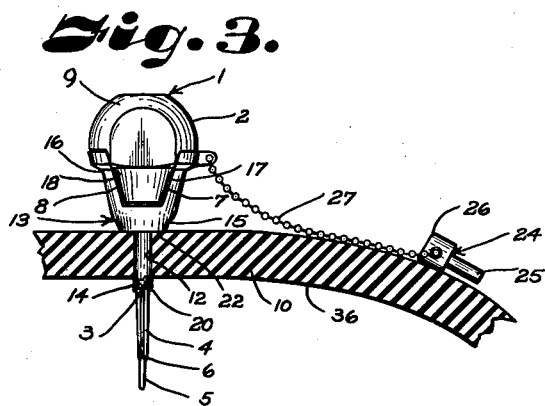
FIG. 3 is a side elevation of the buffer tool nested within the tube tool, the combination shown inserted in a puncture hole of a tire wall which is shown in section.
Figure 4:
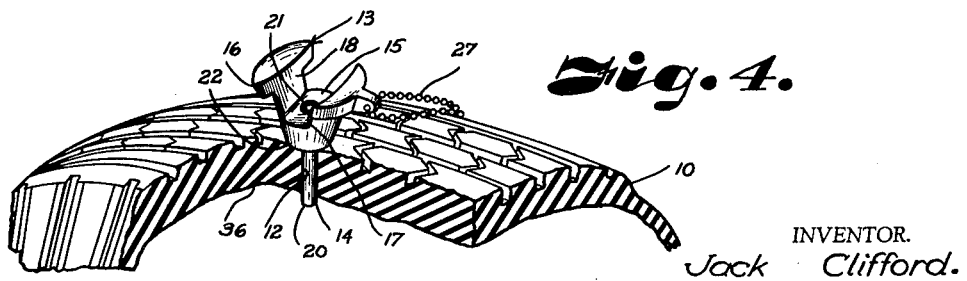
FIG. 4 is a perspective view of the tube tool inserted in a tire tread shown partly in section.

A complementary tool 13 for use with the abovementioned buffer tool is referred to herein as a tube tool, and comprises a thin walled, slightly tapered hollow tube 14 mounted within a base 15 of a bifurcated or Y-section 16 having upwardly and outwardly extending walls 17 and 18, FIG. 4. The hollow tube 14 is tapered so that its tip portion 20 is slightly smaller in outside diameter than the section 21 which is contained within base 15. Hollow tube 20 has a somewhat sharpened edge; however, the edge thereon is dull enough so that it will not easily cut rubber. The base 15 exhibits shoulder 22 which provides a stop during the insertion of hollow tube 14 into the tire. Hollow tube 14 is of a length which extends from the shoulder 22 of base 15 to beyond the inner surface of the tire after insertion so as to extend through the thickest part of the tire even if inserted at a more acute angle with the tread surface than shown. When the buffer tool 1 is nested within the tube tool 13, FIG. 3, walls 17 and 18 of bifurcated or Y-section 16 engage the upwardly and outwardly extending sides 7 and 8 of the buffer tool handle 2 so that the tube tool and the buffer tool form a unitary handle easily held in the palm of the hand which can be rotated without causing relative rotation of the tube 14 and shank 3. The fluted section 4 of the buffer tool extends only up to the tip 20 of hollow tube 14 when the two tools are nested together so that pockets will not be formed in tube 14 to act as debris traps.

A third device useful in the practice of this invention is gauge 24 (FIGS. 3 and 8) consisting of a shank 25 mounted within a larger diameter head member 26. The shank 25 fits within the hollow tube 14 at base 15 as illustrated in FIG. 9. For convenience in handling the gauge 24, a chain or the like 27 is provided to secure the gauge to the tube tool 13 as shown in FIG. 3.

A plug 28, recommended for use in practicing this invention, is illustrated in FIGS. 5 and 6 and consists of cured rubber plug portion 29 which may be cylindrical or slightly conical in shape and to which is bonded a coating or shroud 30 of partially cured gum rubber which surrounds said cured rubber portion, although a plug made completely of cured rubber can be used. A protective cover 31 surrounds the gum rubber shroud 30 and is removed therefrom when the plug 28 is used as now described. The gum rubber shroud 30, when inserted in rubber cement, absorbs some of the solvent therein and becomes soft and sticky, providing an excellent medium for bonding or vulcanizing the walls of puncture hole 12 to the walls of the cured rubber plug portion 29. The process involved is though to be a form of actual vulcanization and will be more fully explained below.

In order for the gum rubber to become sufficiently soft and sticky, the rubber plug must be soaked in rubber cement for a period of one to five minutes. A means to soak the plug is illustrated in FIG. 7 and comprises wire retainer 32 grasping the rubber plug 28 by loop 3 and holding it for soaking beneath the surface of liquid rubber cement 34 in a receptacle 35. It has been found that the natural oil usually found on fingertips is detrimental to proper bonding of gum rubber surfaces; hence, protective cover 31 should not be removed until soaking is required and retainer 32 is used to handle plug 28 during transfer to tube 14.

To practice the invention, buffer tool tip 5, edges 6, and buffer section 4 are dipped in rubber cement which, in this instance, acts as a lubricant. Tip 5 is probed into the puncture hole forcing a little of the rubber cement into the hole to provide suitable conditions for inserting the larger diameter buffer section 4 without tearing the rubber. Tip 5 acts as a guiding means for section 4 and indicates the proper direction of insertion which is often not apparent from the outside of the tire. As the buffer section 4 is inserted into the tire, the tool is rotated, tapered edges 6 and the buffer section 4 roughing the walls of the puncture hole to condition them for bonding. This procedure also cleans the wall surfaces. The cement held between the flutes is deposited within the hole and intimately applied against the wall surfaces during this process. After rotating the buffer tool a few times, it is withdrawn and the above steps may be repeated to deposit more cement on the wall surfaces. The buffer tool is then nested within the tube tool. Afater redipping the parts 4, 5 and 6 in rubber cement, the combination is inserted into the hole up to shoulder 22 of the tube tool 13, as shown in FIG. 3. During this insertion, the hole is stretched gradually from the diameter of the probe tip 5, over tapered edges 6, to the diameter of the buffer section 4 and finally to the diameter of the outside of hollow tapered tube 14. The buffer tool, no longer being in contact with the tire, is withdrawn, leaving hollow tube 14 communicating between the inside and the outside of the tire. The rubber plug 28, which has been soaking in the rubber cement during the preliminary steps outlined above, is withdrawn from the cement, its gum rubber surface swelled due to the absorption of cement. The rubber plug 28 is inserted into the hollow tube 14 which is slightly smaller in inside diameter than the outside diameter of the swollen gum rubber surface 30 in order that the plug will be retained but movable in the inside of the hollow tube. Shank 25 of the gauge 24 is then inserted in hollow tube 14, as shown in FIG. 9. The length of shank 25 controls the extent to which the plug 28 extends beyond the tip 20 of hollow tube 14, around 3/16 inch generally being sufficient.

In order to repair the hole, the tube tool is now simply withdrawn from the tire in a preferably non-rotating motion, as shown in FIG. 10. As the plug 28 is being withdrawn with the tube tool, tip 20 passes the inner surface 36 of the tire before plug 28. When tip 20 is beyond this point, the inside tire surface 36 around the hole is no longer retained in a stretched condition and contracts adjacent the end 37 of plug 28 which extended beyond tip 20. As the hole 12 contracts, it grasps plug 28, engulfing and compressing it and preventing its withdrawal with hollow tube 14. FIG. 11 illustrates the final position of the plug 28 contained within the hole 12 and acting as a seal. The tire is now ready for immediate service, the plug 28 being tightly held even through the cement may not be dry. However, normal use of the tire will provide heat in the tread which will aid in curing or drying the cement and vulcanizing the partially cured gum rubber section 30 to the tire, making plug 28 a permanent part of the tire.

It is to be noted that puncture holes may vary in size and direction, necessitating that repair tools and plugs vary somewhat in size when unusual conditions are encountered.

It is to be understood that while I have illustrated and described one form of my invention, it is not to be limited to the specific form or arrangement of parts herein disclosed and shown except insofar as such limitations are included in the claims.

What I claim and desire to secure by Letters Patent is:
1. The method of depositing in a puncture hole extending into a rim mounted tubeless tire a cylindrical repair plug of substantially constant diameter and having a soft, tacky, partially cured vulcanizable rubber exterior portion comprising; introducing a lubricating rubber cement into said hole, buffing the walls of the hole in the presence of said lubricating cement, resiliently stretching said hole by inserting thereinto one end of a hollow tube having an internal diameter substantially equal to the outside diameter of said plug so as to receive said plug therein without damage to said plug exterior portion, continuing said insertion into said hole until said hollow tube end extends past the inner surface of said tire, urging said plug into said tube until one end of said plug extends past said one tube end, partially withdrawing said tube from said hole while permitting said plug to move with said tube so as to bring said extending plug end into contact with the hole portion at the inner surface of the tire and allow said hole portion to contract about said plug end to overcome the gentle retaining force tending to retain said plug in said tube, and continuing said withdrawal whereby said plug is pulled without damage to the exterior portion thereof from said tube by the plug end being trapped in said contracted hole portion, said plug being compressed in said hole as said tube is withdrawn leaving said plug deposited in said hole.

2. Apparatus for repairing a tubeless tire puncture hole with a cylindrical repair plug of substantially constant diameter and having a soft, tacky, easily removed bonding shroud thereon comprising; a buffer tool and a tube tool, said buffer tool having a longitudinal shank divided into an upper section and a lower section, said upper section being of a diameter substantially equal to the diameter of said shrouded plug, said lower section being tapered to a smaller diameter as it extends from said upper section and having a plurality of substantially longitudinally extending dull flutes thereon forming lubricating cement retaining spaces therebetween, said tube tool comprising a handle having a thin walled hollow tube secured thereto and extending therefrom a distance greater than the wall thickness of the tire, said tube having a substantially constant cross section and an internal diameter substantially equal to the outside diameter of said shrouded plug so as to receive and gently retain said plug therein without damage to said shroud, said shank slidably fitting within said tube with said buffing section extending past said tube so as to present a tapered puncture hole stretching member to aid in inserting said tube into said puncture hole whereby upon withdrawal of said buffer tool, said tube tool is adapted to receive and gently retain said plug for deposit in said hole without damage to said shroud.

3. The method of depositing in a puncture hole extending into a rim mounted tubeless tire a cylindrical repair plug of substantially constant diameter and having a soft, tacky, partially cured vulcanizable rubber exterior portion comprising; introducing a lubricating rubber cement into said hole, buffing the walls of the hole in the presence of said lubricating cement, resiliently stretching said hole to an internal diameter substantially equal to the outside diameter of said plug so as to receive the plug in said hole without damage to said plug exterior portion, urging said plug into said hole until one end of said plug extends past the inner surface of said tire, and permitting said hole to contract about said plug progressively from the inner surface of said tire to the outer surface of said tire, whereby said plug end is first trapped in said hole to retain the balance of said plug in said hole as the balance of said hole contracts.

4. Apparatus for repairing a tubeless tire puncture hole with a cylindrical repair plug of substantially constant diameter and having a soft, tacky exterior thereon comprising; a buffer tool and a tube tool, said buffer tool having a buffing section including a plurality of substantially longitudinally extending tapered, dull flutes thereon forming lubricating cement retaining spaces therebetween, said tube tool comprising a handle having a thin walled hollow tube secured thereto and extending therefrom a distance greater than the wall thickness of the tire, said tube having an internal diameter substantially equal to the outside diameter of said plug so as to receive and gently retain said plug therein without damage to said exterior, said buffer tool slidably fitting within said tube with said buffing section extending past said tube so as to present a tapered puncture hole stretching member to aid in inserting said tube into said puncture hole, whereby upon withdrawal of said buffer tool, said tube tool is adapted to receive and gently retain said plug for deposit in said hole without damage to said exterior.

References Cited in the file of this patent
UNITED STATES PATENTS

| | | |
|---|---|---|
| 490,369 | Sloper | Jan. 24, 1893 |
| 567,402 | Moomy | Sept. 8, 1896 |
| 616,572 | Herrick | Dec. 27, 1898 |
| 639,986 | Isbills | Dec. 26, 1899 |
| 725,171 | Sutton | Apr. 14, 1903 |
| 1,348,005 | Hirst | July 27, 1920 |
| 1,545,831 | Hirst | July 14, 1925 |
| 2,692,001 | Hawkinson | Oct. 19, 1954 |
| 2,931,261 | Crandall | Apr. 5, 1960 |